Feb. 22, 1966   J. A. PATTERSON   3,236,367
ION EXCHANGE RESIN COLUMN AND METHOD OF STABILIZING SAME
Filed Aug. 21, 1961
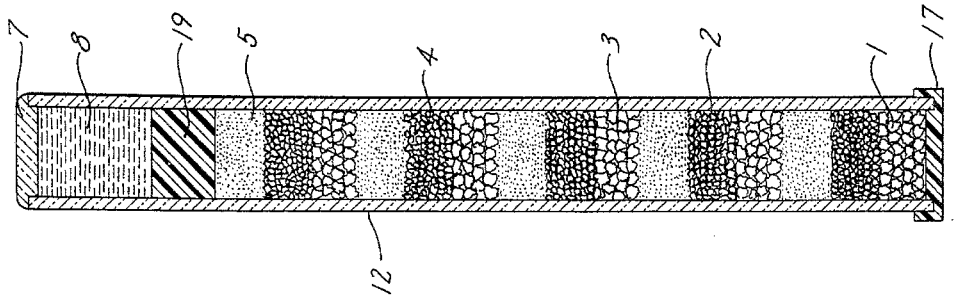
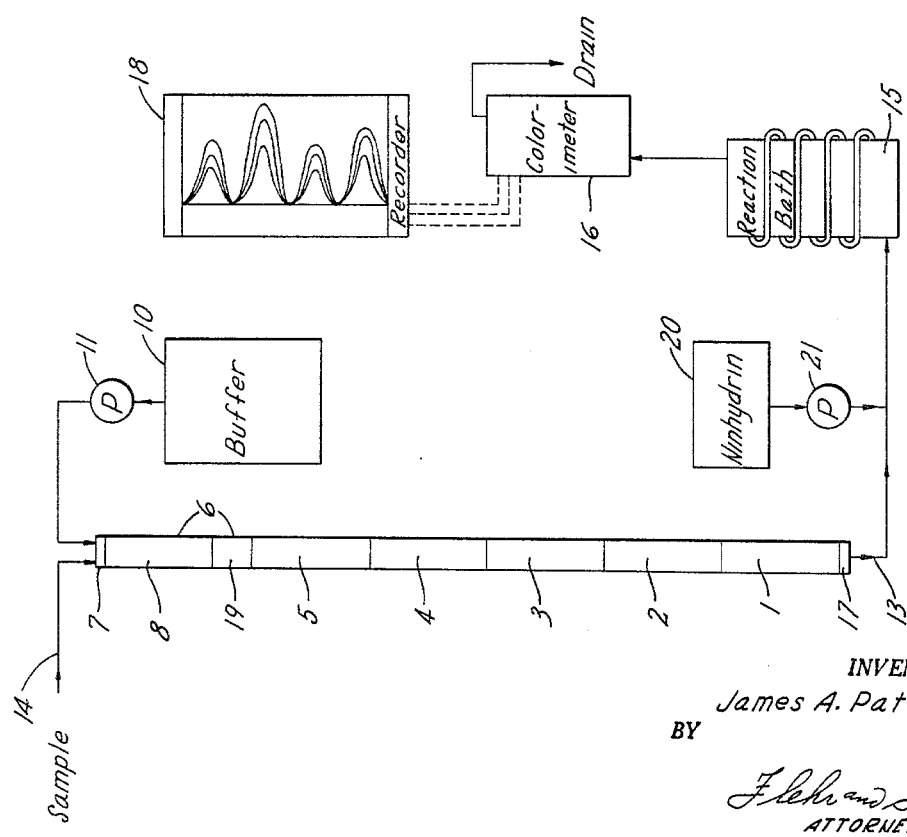
INVENTOR.
James A. Patterson.
BY
Flehr and Swain
ATTORNEYS.

United States Patent Office

3,236,367
Patented Feb. 22, 1966

3,236,367
ION EXCHANGE RESIN COLUMN AND METHOD
OF STABILIZING SAME
James A. Patterson, Los Altos, Calif., assignor to Beckman Instruments, Inc., a corporation of California
Filed Aug. 21, 1961, Ser. No. 132,946
2 Claims. (Cl. 206—46)

This invention relates generally to ion exchange resin columns and more particularly to an ion exchange resin column which may be prepared and shipped without damage to its contents.

Ion exchange resin columns are finding increasing uses in the separation and analysis of mixtures of various chemical compounds, and in particular amino acid mixtures such as occur in diverse physiological products, tissue extracts, protein and peptide hydrolysates, foods, culture media, pharmaceutical and other products.

In the medical field, for instance, the determination of amino acids present yields data which can be used in the diagnosis of diseases.

Ion exchange resin columns can only be prepared with great care, under exacting conditions and by highly skilled operators. The resin particles which occupy most of the column, for instance, must usually be arranged according to a relatively elaborate scheme. Since these particles are of uneven size, though small (20–75 microns as example), the larger particles tend to fall to the bottom, and the smaller ones to remain on top. It is, however, desired to achieve a relatively uniform distribution of larger and smaller particles throughout the length of the column. Accordingly, it is the usual practice to install several integral zones of resin particles, separated from each other, each zone offering a statistical distribution of large particles at its bottom to small particles at the top. A 150 cm. column typically contains five such integral zones. The installation of these zones is delicate and its successful carrying out is essential to the proper operation of the column.

The most economic and satisfactory location for preparing ion exchange resin columns would be directly at the factory, where a trained skilled operator can simultaneously prepare a large number of columns under easily controlled conditions. At present though, it is necessary to prepare the columns at the site where the columns and their connecting equipment are to be utilized, since a factory prepared column tends to undergo mixing and attrition of the irregular shaped resin particles due to vibratory and shock forces incurred in transit from the factory. Variations in thermal conditions encountered during shipment also have a detrimental effect, and rupture of the column may even take place at freezing temperatures. Another undesirable effect against which the resin column should be guarded and stabilized is the contraction and expansion which frequently results from moisture changes.

It is, therefore, the present practice to prepare the columns on-site, although this requires an experienced field engineer or technician, and the time requirement for the installation set-up is relatively long, being in the order of a day or more. The installation of such columns is as a result expensive and inconvenient. Conditions on location, moreover, are not always the most favorable, since control of the preparation is not as thorough as it might be in a laboratory specially designed for the purpose. Consequently, there is more chance that the apparatus may fail or be otherwise defective because of improper preparation.

It is, therefore, a general object of the present invention to provide an improved ion exchange column.

It is another object of the present invention to provide an ion exchange column which may be prepared at a factory or central location, shipped and used directly by the user without requiring further skilled preparation.

It is still another object of the present invention to provide a method whereby columns are formed which can withstand shock and vibration, such as may be encountered during shipment, without mixing or attrition of the resin particles.

It is a further object of the present invention to provide an ion exchange column in which large ambient temperature variations and in particular, below freezing temperatures, do not cause freezing or rupture of the column or other effects detrimental to its proper operation.

It is another object of the present invention to stabilize resin beds to minimize contraction and expansion of same as a result of changes in moisture content.

Other objects of the invention will appear more clearly from the following description in which the preferred embodiment of the invention has been set forth in detail in conjunction with the accompanying drawings, in which:

FIGURE 1 schematically shows an analyzer apparatus, incorporating an ion exchange resin column of the type which may be used in connection with the invention; and FIGURE 2 is a sectional view of the resin column of FIGURE 1 incorporating several features of the invention.

Referring now to the drawings, the analyzer apparatus shown in FIGURE 1 comprises an ion exchange column 12, which is filled with several successive layers of resin particles of various predetermined sizes, designated 1, 2, 3, 4 and 5. The resin particles do not fill the column all the way up to the top, but leave an empty space 6. A buffer reservoir, 10, supplies a suitable buffer to the top of the column by means of a pump 11. The sample, containing a mixture of separable compounds, which one desires to analyze is introduced at the top of the column as indicated by the arrow 14. The column then effects a separation of the compounds. In the analysis of amino acids for example, the different amino acids contained in the sample are retarded by the resin in their travel through the length of the column for varying lengths of time characteristic of each acid. Thus, as the individual amino acids emerge from the column at the bottom 13, they are separated and ready for identification and quantitation.

The buffer carrying the sequence of separated amino acids may be met by a stream of an analytical detection reagent capable of yielding a color reaction with the compounds of the sample which are to be analyzed. This reagent may be supplied from a reservoir 20 by means of a second pump 21. The buffer and reagent mixture then enter a reaction bath 15, where the color reaction between the detecting reagent and the sample compounds proceeds to completion, yielding a characteristic color of measurable intensity.

The color density of each reaction product can then be measured as the product flows throuh a colorimeter 16. Values of these measurements are recorded by a suitable recording instrument 18.

Where it is desired to analyze mixtures of amino or imino acids, it is common to utilize ninhydrin as the analytical detecting reagent. Ninhydrin yields an intense blue color in reacting with amino acids and a yellow color with imino acids.

The resin used typically will be a sulfonated styrene-8% divinyl benzene copolymer, though other materials may be used.

As shown in FIGURE 2, the column 12 is packed with a series of integral zones of resin, 1, 2, 3, 4 and 5. The sizes of the particles vary within each zone in a predetermined manner. For proper operation of the column, it is necessary that each integral zone remain intact after initial preparation by a skilled installer.

Apparatus of this general type is described in various publications and a commercial model of such apparatus is the Amino Acid Analyzer Model 120 sold by Spinco Division, Beckman Instruments, Inc., Palo Alto, California.

Generally, the most important aspect of the invention is directed to the intentional "fixing" of the resin column. Fixation of the column insures that no mixing or attrition of the resin particles in the column occur during shipment. It may be effected by means of a gelling agent which fills the interstices between the resin particles and prevents relative movement between them until it is removed at the site of use. It can also be achieved by providing a suitable retention plug at the end of the column. It may also be effected by a combination of the foregoing.

Another aspect of the invention lies in the provision of an antifreeze mixture, effective in safeguarding the desirable qualities of the resin and preventing column rupture as the column is subjected to temperature extremes from minus 30° to plus 50° C. The antifreeze mixture may be a liquid or a gel. In any case, it fills the interstices between the resin particles of the column and thus, contributes to its stability.

Generally speaking, it is especially desirable to use an antifreeze solution which is also a gel at normal temperatures or below. Most gels, moreover, possess some antifreeze properties. Both advantages, therefore, may be conveniently combined by a judicious selection of materials.

It must, however, be understood that the invention is not meant to be limited to compositions offering both these advtanges; materials offering one or the other property may be employed successfully in protecting the column from detrimental effects, and the invention is directed to such protective means in general. It is of no import whether such means is used singly or in combination, or against which particular effect it is intended to guard in a given case.

In achieving the stabilization and fixing of the column contents as well as their protection against freezing, one may, therefore, employ as the antifreeze mixture a gelatinous substance which is a gel at the atmospheric temperatures to which the column is likely to be subjected during shipment and therefore, holds the contents of the column in place. One may also use a non-gelatinous antifreeze which fills the interstices existing between the ion exchange resin particles, along with a retention plug in at least one end of the column so as to limit movement of the particles.

A suitable antifreeze mixture or solution should prevent cracking, swelling, shrinking or channeling of the resin bed through wide variations in temperature. Evidently, it is also necessary that it does not react with the resin nor plug the resin pores.

Where a gel is used, which stabilizes the column contents while at the same time imparting antifreeze characteristics, it is especially convenient to select a composition which may be poured in fluid form, and gels upon standing or as the temperature is lowered. Thus, the best materials undergo a marked change in properties at about 60° C., being relatively fluid above that temperature and gelatinous at lower temperatures.

According to the most efficient procedure, the material or solution is introduced through the resin-packed column at high temperature, where it is relatively fluid. This can be achieved by heating both the material and the column. Later, as the column returns to normal temperatures, the material gels or solidifies, fixing the resin permanently. The ion exchange bed thus becomes incorporated into a permanent gel matrix and immobilized. To release the ion exchange bed upon installation of the column, one merely needs to increase the bed temperature to the melting point of the gel matrix. The gel in the liquid state is then flushed from the column which returns to its normal state, ready to be used in analysis.

As a gelling agent (which also possesses some antifreeze properties), one may utilize a natural gel selected from chemical groups such as lignins, sugars, starches, gum arabic, gelatins, pectins and carboxy methylcellulose or derivatives thereof. One may also alternatively select a synthetic gel from various groups such as aqueous soluble polymers, aqueous dilutable polymers, polyalcohols, polyvinyl alcohols and polyelectrolytes; or one may use a combination of the preceding.

The gelling agent may be used together with a plug, both acting to stabilize and "fix" the column. However, the gelling agent is usually so effective of itself in stabilizing the column that the addition of a plug becomes unnecessary. Of course, the plug may also be used alone. In any case, whether the retention plug and the gelling agent be used together or singly, such effects as attrition of the particles, freezing and rupture of the column and mixing of the different zones can be eliminated for all practical purposes. Movement of the particles inside the column under shock or vibratory forces is also minimized, preventing the mixing and attrition of particles which usually occur as a result of such forces during transit in shipments of the prepared column.

As it has been stated earlier, it is possible to utilize an antifreeze which is non-gelling. In that case, one will normally combine its use with that of a retention plug, the antifreeze serving mostly to prevent rupture of the column or freezing of its contents at low temperature, and the retention plug having as its main function the stabilizing of the column when submitted to vibration and shock.

As it has been stated earlier, it is possible to utilize an antifreeze which is nongelling. In that case, one will normally combine its use with that of a retention plug, the antifreeze serving mostly to prevent rupture of the column and freezing of its contents at low temperatures, and the retention plug having as its main function the stabilizing of the column contents when submitted to vibration and shock. In any case, since it is always necessary to regenerate the resin (for instance, with sodium hydroxide) before operating the column, the addition of the antifreeze does not require the user to form any additional operation; at the same time as the sodium hydroxide is used to regenerate the resin in the column, it serves to eliminate the antifreeze solution, thus successfully fulfilling a double function.

Where a gelling agent is used, it can similarly be eliminated with sodium hydroxide, sometimes with the additional use of heat in order to liquefy it.

Graphically, the utilization of my invention may best be visualized by considering the drawings of FIGURE 2, which illustrate the use of a liquid antifreeze solution together with a retention plug. The resin is arranged in a series of zones, 1, 2, 3, 4, 5, which fill about four-fifths of the height of the column. At the bottom a retention plug 17, keeps the resin within the column. The plug is usually of a porous material which permits the passage of liquids such as amino acids and the buffer solution of the reservoir 10 (cf. FIGURE 1), but is impervious to the resin.

As part of the invention, a second retention plug 19 is installed on top of the resin bed. Located between the two tight fitting plugs 17 and 19, the resin is thus immobilized and rendered resistant to vibratory and shock forces.

The antifreeze liquid 8 is poured on top of the plug, and fills the column almost to its full height, leaving only enough space to permit the insertion of a glass stopper 7.

One particularly effective antifreeze solution consists of an aqueous solution containing 49% propylene glycol and 0.2 N sodium citrate. This solution also possesses gelling properties. At about 60° C., the propylene glycol mixture is quite fluid, but it forms a gel and sets permanently at nearer normal temperatures (e.g., 45° C. or below).

As a retention plug, one may use either a viscous liquid which gels upon standing, or a precision fitted plug which is introduced as a solid. As an example of the first type, carboxy methylcellulose (CMC) containing basic aluminum acetate and disodium phosphate gives excellent results. This mixture is introduced at the top of the column as a viscous fluid material, and it gradually forms a gel which stops the opening of the column across its entire surface, acting very much like a cork on a bottle. The viscosity of the fluid is so great it stays on top of the resin bed, covering it entirely upon gelling. The aluminum acetate of the formulation is used to initiate cross linking, while the disodium phosphate prevents the gel from setting up too rapidly. The gel normally takes four hours to set firmly, but afterward it will hold its shape indefinitely. It may easily be dissolved on site with sodium hydroxide when it is desired to eliminate it in order to open the column for use. This gelable viscous type of plug has the advantage of being easily yieldable, so that it may adjust to shift volume changes in the column due to variations in temperature. It is therefore preferred.

Instead of employing a plug of the type described above, i.e., a viscous fluid which solidifies or gels on standing or cooling, one may use a solid plug and introduce it in the neck of the column down to the top of the resin bed. Such a plug must be made of a material which is capable of being shaped to the exact contour of the neck of the column and is inert to its contents.

A suitable material for a solid plug is a type of porous Teflon sponge. Thus the plug 19 can be made of the same solid material as plug 17, and it may also be porous. If antifreeze is used with the plug, it is allowed to penetrate and saturate the resin bed while an additional supply remains on top of the plug at 8 in ample quantity. One may also introduce the antifreeze first, up to a level just below that of the plug 19, insert the plug afterwards, and thus leave space 8 vacant or filled with some inert packing material.

One advantage of a solid, porous type of plugging material is that the plug, once located as is shown in FIGURE 2, need not be removed when the column is operated since it permits the passage of liquids, including the sample and the buffer solution. It is merely necessary to remove the antifreeze with a solution of sodium hydroxide before operating the column.

Columns were prepared in accordance with the foregoing and tested. The following are examples of the action of the antifreeze solutions used with a CMC plug.

*Example I.—Preparation and elimination of a CMC*

A gelable resin column retention plug was made from a mixture as follows:

Solution 1—0.75 g. (1.50%) CMC–7H in 45 ml. H$_2$O at 36° C.
Solution 2—0.15 g. (20.0%) basic aluminum acetate (based on wt. of CMC) and 1% (1.5 mg.) of disodium phosphate (based on wt. of aluminum acetate) in 5 ml. of H$_2$O.

Solution 1 was prepared by dissolving the CMC into about 90% of the total water to be used while stirring. For solution 2, a slurry was made of the disodium phosphate and the remaining 10% of the water. Solution 2 was added to solution 1 while stirring. (Solution 2 should not be allowed to stand but should be added to solution 1 immediately.)

After the material had gelled, it was dissolved with 0.2 N sodium hydroxide solution, the solution being withdrawn from the end of the column where the plug was located. (This procedure is preferable to pumping the solution through the resin.)

*Example II.—Thermal shock and low temperature column resistance test*

An aqueous solution containing 40% propylene glycol and 0.2 N sodium citrate was pumped at 60 ml./hr. into a 15 cm. resin column at 50° C. A total column shrinkage of 0.5 cm. due to dehydration was observed. A 2 cm. carbomethoxy cellulose plug prepared as described in Example I was inserted on top of the resin bed and the column positioned horizontally in the deep freeze (−30° C.) for 72 hours. After thawing, the column was attached in its operating position to an analyzer unit, at 50° C. The resin was regenerated and equilibrated. A standard amino acid solution was analyzed. There was no change in the resin either visibly or from the results obtained when the same test solution was analyzed through a standard column utilized as a control. This indicates that the column is resistant to freezing temperatures.

*Example III.—Column shock and vibration resistance test*

A resin column of the type tested in Example I was prepared for shipment and stabilized as outlined above, the same antifreeze solution and retention plug being utilized. The resin column was then placed horizontally on a platform shaker operating at 200 traverses per minute for 7 hours. The column was maintained at 60° C. At the end of this time a slight tilt was observed at the top of the resin bed. However, after placing the column in position on the analyzer and leveling the top of the resin bed by resettling the top ½ cm. of the bed, an analysis of a standard mixture of amino acids with the column yielded excellent results. The column was therefore relatively immune to vibrations.

The resistance of the column to vibration in this case is believed to be attributed to the combined operation of three distinct factors:

(1) The action of the retention plug in holding the column contents in place,
(2) The very tight packing of the resin particles in the column, and
(3) The viscosity of the liquid which tends to hinder movement of particles within the column.

*Example IV.—Elimination of the antifreeze prior to use of the column*

A propylene glycol mixture of the type described in Example I was pumped into a 150 cm. column at 50° C. for eight hours at 15 ml./hr., until complete resin saturation was achieved. The bed shrinkage was less than 2% (15.47 cm. to 152 cm.). After remaining in contact with the antifreeze mixture for twenty-four hours, the glycol was eluted by replacement with sodium hydroxide, and the resin regenerated to its sodium ionic form in the same operation. 0.2 N sodium hydroxide was utilized. The time required for the sodium hydroxide to reach a point 100 cm. from the bottom of the resin bed was 3½ hours. Excess sodium hydroxide was then washed out and the resin equilibrated with a sodium citrate buffer solution. The buffer solution (pH 3.25) was pumped through the column at 30 ml./hr. Two and one-half hours were required to completely equilibrate the resin. The operating pressure was 38 p.s.i. and the final column height 152.5 cm.

In none of the above examples did the resin bed exhibit any volume changes due to temperature extremes. At no time did it reveal any ruptures or channeling in the course of warming up or cooling. The CMC plug similarly remained unaffected.

It will, therefore, be seen that the problem of column rupture, freezing, mixing and attrition of resin particles in ion exchange resin columns can be successfully eliminated by the present invention, utilizing a suitable antifreeze solution, a gel, a retention plug, or a combination of the foregoing.

Having thus described my invention, I claim:

1. An ion exchange resin column comprising an elongated cylindrical tube having a closure at one end and open at its other end, resinous particulate material packed in said column, high molecular weight antifreeze mixture containing a glycol disposed within said column and filling the interstices between said particles to prevent freezing of the same and a yieldable, porous chemically inert plug at the open end of said column to yieldably hold the resinous material in the column while permitting said antifreeze to permeate the plug on either side thereof, and permitting thermal contraction and expansion of the column, and impervious stopper means closing the open end of the tube.

2. The method of forming a stabilized resin column which comprises packing resinous particulate material into a cylindrical tube, introducing into said cylindrical tube high molecular weight antifreeze containing glycol and inert to the resinous material, and subsequently applying a porous yieldable closure to the open end of said cylindrical column to yieldably hold the resinous material in the column and permit thermal contraction and expansion of the column, said antifreeze being added in an amount sufficient to fill the interstices between the resinous particles to prevent freezing of the same and to maintain an additional supply above the yieldable closure, and finally closing said tube by means of an impervious stopper.

References Cited by the Examiner

UNITED STATES PATENTS

| | | | |
|---|---|---|---|
| 399,945 | 3/1889 | Tarbox | 18—55 |
| 410,383 | 9/1889 | Stahl | 18—55 |
| 1,473,327 | 11/1923 | Sperr | 252—71 |
| 1,768,632 | 7/1930 | Reinhart | 252—71 |
| 1,873,306 | 8/1932 | De Ville | 210—278 |
| 2,038,724 | 4/1936 | Eichengruen | 252—71 |
| 2,061,715 | 11/1936 | Pick | 210—282 |
| 2,094,564 | 9/1937 | Schenck et al. | 252—73 |
| 2,302,450 | 11/1942 | Laughlin | 210—264 |
| 2,575,490 | 11/1951 | Condon et al. | 220—42 |
| 2,637,462 | 5/1953 | Becker | 220—42 |
| 2,902,155 | 9/1959 | Lundeen | 210—190 X |
| 2,910,182 | 10/1959 | Sletten | 210—264 |

FOREIGN PATENTS

| | | |
|---|---|---|
| 191,594 | 1/1923 | Great Britain. |

REUBEN FRIEDMAN, *Primary Examiner.*

DOUGLAS J. DRUMMOND, *Examiner.*